(12) United States Patent
Brunner et al.

(10) Patent No.: US 7,109,363 B2
(45) Date of Patent: Sep. 19, 2006

(54) METHOD FOR THE PRODUCTION OF FATTY ACID ESTERS

(75) Inventors: Karlheinz Brunner, Grosskrotzenburg (DE); Rainer Frische, Frankfurt (DE); Rainer Ricker, Dietzenbach (DE)

(73) Assignee: Westfalia Separator AG, Oelde (DE)

( * ) Notice: Subject to any disclaimer, the term of this patent is extended or adjusted under 35 U.S.C. 154(b) by 645 days.

(21) Appl. No.: 10/433,407

(22) PCT Filed: Nov. 29, 2001

(86) PCT No.: PCT/EP01/13957

§ 371 (c)(1),
(2), (4) Date: Jun. 2, 2003

(87) PCT Pub. No.: WO02/46340

PCT Pub. Date: Jun. 13, 2002

(65) Prior Publication Data

US 2004/0102640 A1 May 27, 2004

(30) Foreign Application Priority Data

Dec. 4, 2000 (DE) ............................. 100 60 329
Dec. 20, 2000 (DE) ............................. 100 63 967
Aug. 17, 2001 (DE) ............................. 101 39 422

(51) Int. Cl.
*C11C 1/00* (2006.01)
(52) U.S. Cl. .................................... 554/169; 554/174
(58) Field of Classification Search ................ 554/169, 554/174
See application file for complete search history.

(56) References Cited

U.S. PATENT DOCUMENTS

| | | | |
|---|---|---|---|
| 2,383,601 A | 8/1945 | Keim ........................ 260/410.9 |
| 2,415,140 A | 2/1947 | Liebscher .................... 260/425 |
| 4,164,506 A | 8/1979 | Kawahara et al. ......... 260/410.9 |
| 6,013,817 A | 1/2000 | Stern et al. .................. 554/167 |

FOREIGN PATENT DOCUMENTS

| | | |
|---|---|---|
| DE | 33 19 590 | 12/1984 |
| DE | 42 28 476 | 3/1994 |
| DE | 43 01 686 | 3/1994 |
| DE | 196 20 523 | 4/1997 |
| EP | 0 127 104 | 5/1984 |
| EP | 0 131 991 | 1/1985 |
| EP | 0 192 035 | 1/1986 |
| WO | 00/75098 | 12/2000 |

OTHER PUBLICATIONS

International Search Report issued in connection with PCT/EP01/13957 under date of mailing of May 17, 2002.
Standard-Search RS 107395 issued on Oct. 31, 2001.

*Primary Examiner*—Deborah D. Carr
(74) *Attorney, Agent, or Firm*—Quarles & Brady LLP

(57) ABSTRACT

A method for the production of fatty acid esters of primary and/or secondary alcohols from raw, unpurified oils or fats containing free fatty acids and slimy substances or from waste oils loaded with free fatty acids from the food industry. Acidic catalytic esterification is performed on the free fatty acids along with extensive deactivation of the slimy substances present with respect to the disadvantageous emulsion-forming property thereof, whereby a water-free primary and/or secondary alcohol and a highly acidic hygroscopic catalyst are added to the starting substance in the form of crude oil or fat or waste oil, the reaction product is rinsed with glycol from a prior alkaline transesterification, whereupon alkaline transesterification occurs for the unmodified remaining glyceridically bound fatty acids in the reaction product of the acidic-catalytic esterification process.

12 Claims, 3 Drawing Sheets

METHOD FOR THE PRODUCTION OF FATTY ACID ESTERS

Figure 1:
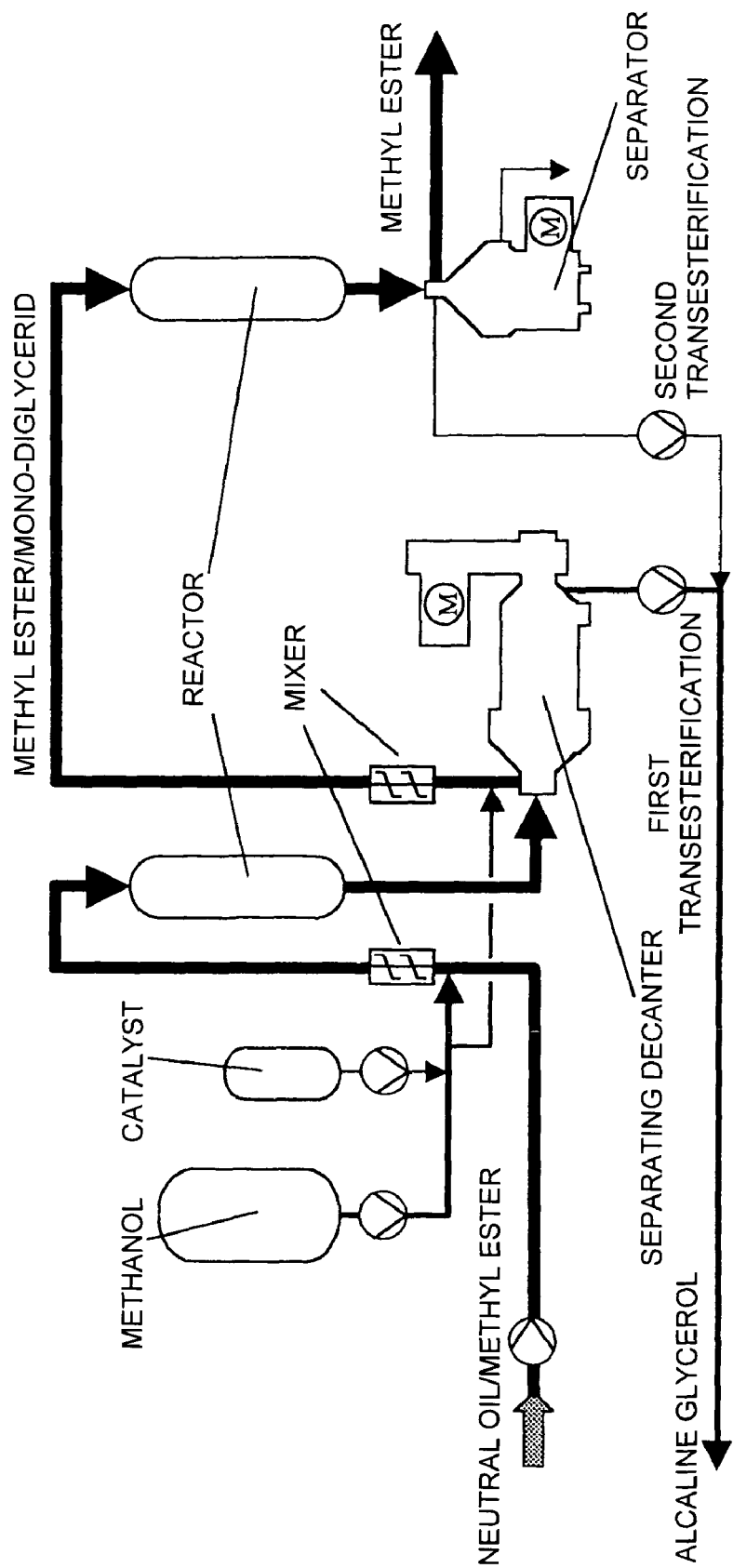

The present invention relates to a method for producing fatty acid esters of primary and secondary alcohols from raw, unpurified oils or fats containing free fatty acids and slimy substances by applying alkaline-catalytic transesterification with formation of a separable glycerol phase and with a preceding acidic-catalytic esterification of free fatty acids. In other words, the invention relates to a method of producing so-called bio-diesel, such as RME (rape methyl ester). Apart from native oils and the fats which have been obtained for the purpose in question, the present invention can also make use of waste oils from the food industry which in addition to an increased content of free fatty acids, contain various other impurities, such as protein residues, combustion and frying residues as are contained in disposed frying oils.

In basic- or alkaline-catalytic transesterification reaction, glycerol fatty acid ester in form of mono-, di- and triesters is almost completely reacted with an alkaline hydroxide or an alkali alcoholate in the presence of primary alcohols in amounts slightly higher than stoichiometric amounts (with an excess of 10% to 50%) at an increased temperature of approximately 30° to 60° C., to the fatty acid esters of the primary or secondary short-chain alcohol (chain length from C1 to C4), while splitting off and separating glycerol.

It is known that this reaction may be accelerated by removing the separated or precipitated glycerol from the reaction solution by technical measures such as centrifugation in separators.

Native oils, however, always contain a more or less high content of free fatty acids which, in the above reaction, are not reacted to fatty acid esters and which react with the added alkaline catalyst to soaps. Even press and solvent extraction oils and fats obtained in careful treatment, not refined and of qualitatively high grade may include contents of free fatty acids of 1 wt. % to 3.5 wt. %. While direct transesterification of these oils is possible, correspondingly higher catalyst amounts will be required than in case of oils having no free fatty acids. Part of the catalyst is used up for neutralization of the free fatty acids under formation of soaps while these soaps are precipitated together with the glycerol being formed.

In order to reduce the required amount of catalyst and yield losses, direct transesterification of native oils is, for example, performed in several stages, wherein in the first stage only as much catalyst is added that the free fatty acids react completely to soaps while using up the catalyst and a small excess of catalyst effects a partial transesterification with separation of glycerol. In this partial amount of glycerol, the soaps so formed will dissolve and can substantially be separated together with the glycerol. In the following reaction stage, fresh catalyst is added which can no longer be destroyed by free fatty acids.

Crude pressed, or solvent extraction oils and fats, particularly hot-pressed oils, always contain, in addition to free fatty acids, slimy substances or gums which form e.g. oil/water, or glycerol/water and glycerol/oil emulsions, respectively which can only hardly be destroyed. These are essentially water-swellable slimy or mucilaginous substances, e. g. lecithins (phosphatides), and slimy substances not swellable in water in form of other phosphorus-containing compounds. Thereby, clean phase separation, for example between glycerol and formed fatty acid ester is prevented. Moreover, washing of the generated fatty acid ester with water which is necessary for removal of glycerol ester, is obstructed by said emulsions. The losses resulting from slimy substances are hardly calculable; they increase, however, far over-proportionally the losses resulting from free fatty acids with an increasing content of free fatty acids.

If the oils and fats are refined prior to transesterification and, in this manner, freed from free fatty acids and slimy substances, the free fatty acids separated as soaps and the fatty acids bound in the phospholipides (phosphatides) constitute lost amounts which could form fatty acid esters. It is unavoidable, moreover, that in refining, neutral oil amounts are removed as well when separating the soaps and the slimy substances together with said soaps and slimy substances and will not take part in subsequent transesterification.

In order to be able to meet the prescribed limit values for bio-diesel with regard to the contents of bound and free glycerol and phosphorus, the slimy substances contained in oils may, furthermore, be separated by relatively simple pretreatment, the so-called "degumming". By this process, the slimy substances present in the oil in dissolved form and, therefore, not separable by sedimentation, are transferred either together with water (water desliming or degumming) or with diluted aqueous acid (acidic desliming or degumming) into hydrated slimy substances which are not soluble in oil and, therefore, separable as precipitate. In separating the substances, however, neutral oil is always entrained as well and, therefore, will not take part in the subsequent transesterification.

If the content of free fatty acids in the used oil or fat amounts to a content of more than 2.5 or even up to approximately 5 wt. %, direct alkaline transesterification, as higher contents of free fatty acids in the oil (FFA >10 wt %), even preceding deacidification will lead to hardly acceptable losses. Waste fats and waste oils as obtained in the oil separators of canteen kitchens often contain such high FFA contents.

Acidic catalytic esterification, or transesterification, respectively, which might alternatively be applied here, however, takes place substantially slower than alkaline transesterification and, regarding process engineering, is generally much more elaborate. A process is known (DE 196 20 523 C1) wherein, first, the oil containing free fatty acids is treated with acidic glycerol in order to transform the free fatty acids into mono-, di- and triglycerides.

As shown in the following, numerous attempts have continuously been made since the forties to overcome the problem of free fatty acids being present in general and with regard to a subsequent base-catalyzed transesterification. While said methods have partly been quite successful, the inventors of the present application had to note that the phospholipid problem (sometimes also referred to as phosphate problem) cannot, thereby, be overcome.

In U.S. Pat. No. 2,415,140 A, treatment of the crude oil (having for example a content of 1.6% of free fatty acids) is effected by means of a raffinate solution of glycerol dissolved in NaOH whereupon the oil phase freed in this manner from free fatty acids is centrifugally separated.

In U.S. Pat. No. 2,383,601 A, oils having very large amounts of free fatty acids (between 10 and 50%) are treated so that alkaline-catalyzed transesterification becomes possible. To this end, acidic-catalyzed preesterification of the free fatty acids with methanol and concentrated sulphuric acid at increased temperature is performed prior to the transesterification. The alcohol is preferably added over-stoichiometrically at an excess of at least more than 50% relative to the stoichiometric amount for transesterification of free fatty acids. In one embodiment of the process, the mixture pre-esterified at 60° C. is washed with water, is dried over sodium sulphate and is filtered before alkaline transesterification takes place. In one embodiment of the process where acidic preesterification and alkaline transesterification take place immediately one after the other, ethanol and sodium ethylate are added directly after preesterification and the reaction mixture is transesterified at 130° C. and under pressure in order to keep the ethanol in liquid form. After distilling off excessive ethanol, the reaction product is transferred into an acidification tank, is dried and distilled. Without such additional acidification, it is not possible in this case to separate a glycerol phase. It is disadvantageous that, in this kind of method, washing with water, drying and distillation are necessary to obtain the fatty acid ester. In distillation, amounts of free fatty acids are unavoidably also distilled due to acidifying the glycerol phase.

In U.S. Pat. No. 4,164,506, large amounts of methanol both serving for preesterification of free fatty acids and as entrainer (carrier) are added. After the preesterification reaction, the oil phase freed from the free fatty acids is separated from the alcohol phase which contains impurities solved therein and the acidic catalyst. A sufficient separation effect can, however, only be obtained if considerable amounts of methanol are used. The purified oil phase obtained in this manner is subjected to an alkaline-catalyzed transesterification. DE 33 19 590 A uses an entraining medium in an acid-catalytic esterification of free fatty acids as well.

In order to be able to reduce the alcohol amount, glycerol was used as entrainer in EP 0 127 104 B1, and acidic preesterification of the free fatty acids was performed in the presence of water-free acidic glycerol and in the presence of alcohol. The purpose of adding water-free acidic glycerol is to provide a catalyst and to bind reaction water that has formed and to remove it on being separated (entrainer). In this case, too, the glycerol may, together with the acidic catalyst, be cycled in a circulation process after having removed the alcohol and the reaction water by distillation.

The recovered alcohol, however, can be reused only after having removed the water. Since of the short-chain alcohols only methanol does not form an azeotrope with water, simple, distillative separation of the water is possible only with methanol.

In EP 0 192 035 B1, it is set out that said method implies a catalyst separation which is relatively difficult and in any case should carefully and completely be conducted while water is simultaneously removed by washing the pre-esterified oil with methanol. The process as stated, moreover, implies losses of esters of the free fatty acids. Therefore, EP 0 192 035 B1 suggests as an alternative the use of solid cation exchange resins in acidic form while in this case the reaction water should be removed after the separation of the reaction mixture from the exchange resin. For acidic pre-esterification, DE 42 28 476 A works with a strongly acidic ion exchanger in a fixed bed reactor.

In DE 43 01 686 C, the ester phase is washed after transesterification with glycerol, crude glycerol or glycerol phase from a preceding transesterification stage in order to avoid washing and process water, and transesterification takes place in two stages. U.S. Pat. No. 6,013,817 A discloses an elaborate multi-stage alkaline transesterification process wherein glycerol phase, too, is added to the transesterification product before the glycerol and ester phases are separated. Distilled-off alcohol is fed back to the process. The separated glycerol phase is neutralized with acid, and an organic phase with fatty acids and esters and again a glycerol phase which is subsequently used for transesterification of this organic phase are separated.

In EP 0 131 991 A and WO 00 75098 A, on the other hand, the alkaline glycerol phase from a transesterification already performed is used for pre-treatment of a crude oil in order to extract the free fatty acids from the starting oil and to separate them together with other harmful accompanying substances such as phosphatides from the starting oil. In this case, the fatty acids are neutralized by using the catalyst having been already employed for transesterification.

The inventors of the present application, however, recognized that while the free fatty acids can be removed in an economic manner by this procedure, a higher amount of phosphatide or phosphorus, respectively, in general, cannot be lowered below the limit value permissible for bio-diesel.

It is the object of the present invention to provide a method of the kind as referred to at the beginning being as simple and cost-efficient as possible by which method it becomes possible to lower the phosphorus content of the crude starting oils and fats to a required extent.

This problem is solved by the subject matter of claim 1. Advantageous further developments are defined in the subclaims.

Figure 2:
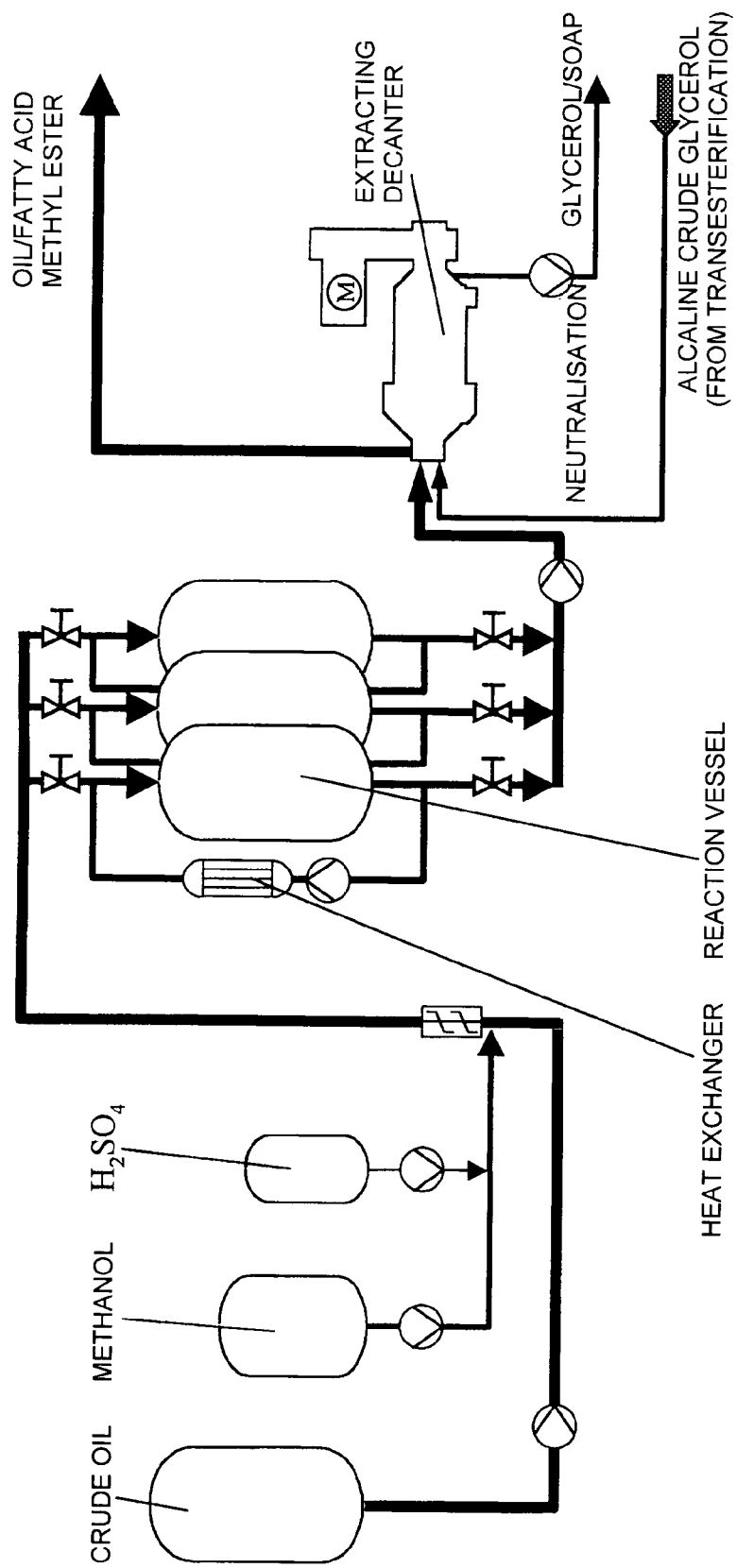
Figure 3:
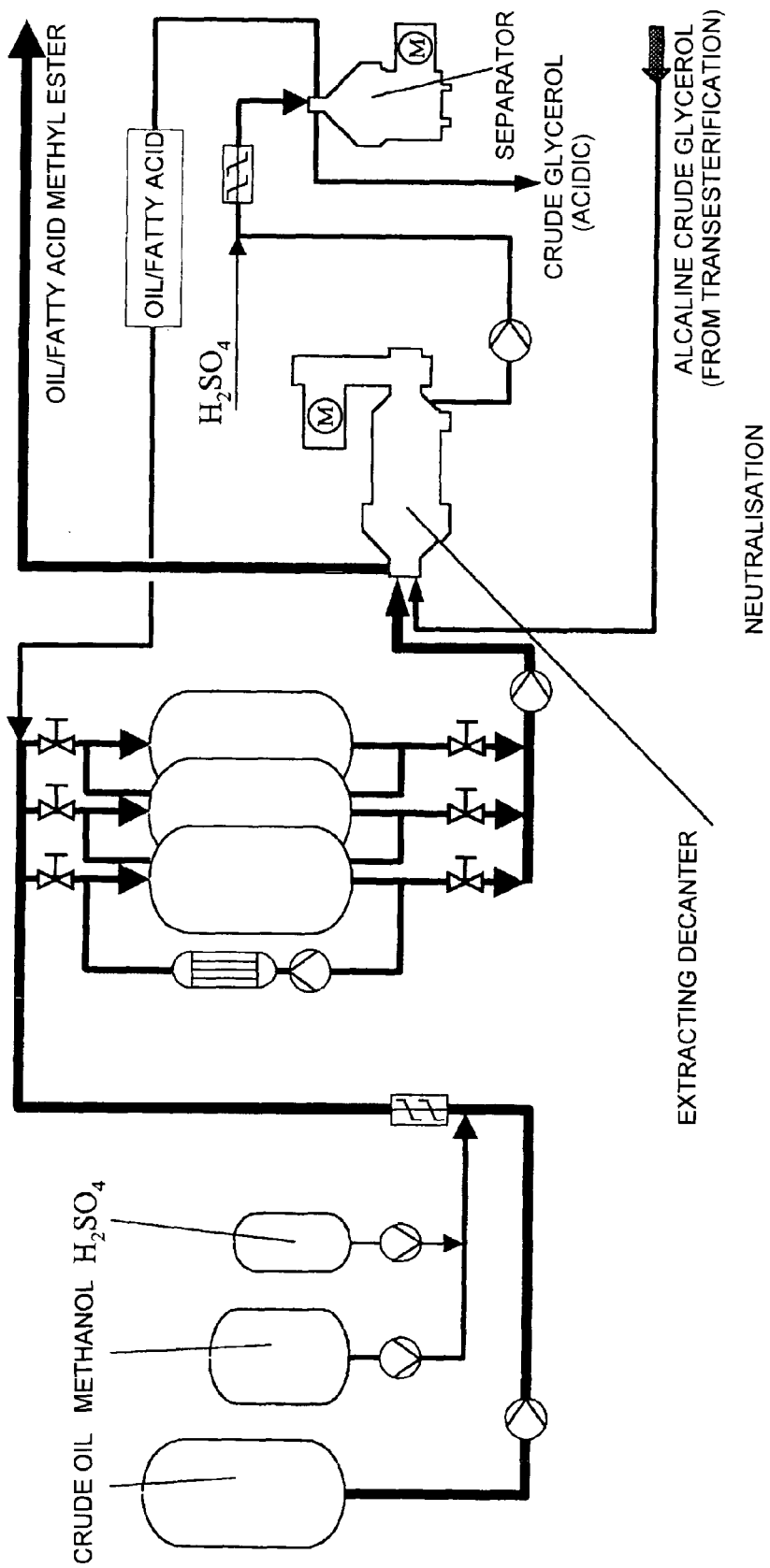

In the following explanation of the present invention, reference is made to the drawings, wherein FIG. 1 shows a possible two-stage alkaline transesterification which is applicable in the present invention, FIG. 2 shows an acidic pre-esterification according to an embodiment of the invention, wherein washing of the reaction product of the acidic pre-esterification takes place in accordance with the invention, and FIG. 3 shows a modification of the pre-esterification with recycling of fatty acids (split fatty acids) which are liberated or freed from the soaps present in the glycerol by an acid.

In accordance with the invention, it is possible to provide a simple and cost-efficient process wherein, despite presence of slimy substances (phospholipides or lecithins, respectively) in the starting oil, the free fatty acids as well can be converted into fatty acid esters, without any loss of neutral oil, and nearly quantitatively.

The process does not require any special separation of reaction water originating in the pre-esterification of the free fatty acids and avoids employing an entrainer or carrier. The process does not fail even if starting from lower-quality oils containing amounts of free fatty acids up to about 20 wt. % and slimy substances which otherwise could not be transesterified at reasonable costs into useful bio-diesel containing the permissible phosphorus amount.

To this end, the starting substance (starting oil or starting fat) is mixed with a relatively small amount being at least the stoichiometrically required amount of water-free or dehydrated alcohol (primary and/or secondary alcohol) as is required for complete esterification of the free fatty acids contained in the starting substance. In this connection, the alcohol excess in comparison to the stoichiometrically required amount for reacting the free fatty acids preferably corresponds to a maximum excess value of 50%. Hence, even with a content of free fatty acids of more than 20 wt. %, the added alcohol amount is still below 10 wt. % relative to the starting oil, or fat, respectively. This value is still significantly below the value employed in the above-mentioned use of glycerol, or methanol, respectively, as entrainer.

In U.S. Pat. No. 4,164,506, for example, alcohol amounts which are always distinctly above the solubility of alcohol in fat are already used for acidic pre-esterification. In methanol, this solubility is between 12 and 15 wt. % at approximately 50° C. According to U.S. Pat. No. 4,164,506, moreover, alcohol is preferably added in amounts which are considerably increased relative to the solubility amount, namely in amounts of 20 to 30 wt. % of alcohol relative to the fat, and even more methanol is added as entrainer for the water generated during the reaction. Finally, prior to transesterification, the alcohol phase is separated from the oil phase purified in this manner together with the acid catalyst and the separated impurities. Due to the high methanol content, the alcohol phase can always be separated as an upper phase.

In the present application, on the other hand, impurities are removed together with the glycerol phase, either with the glycerol wash phase or, at the latest, together with the glycerol phase of the transesterification product.

In this connection, it should be noted that, in the present invention, in case of an increased content of free fatty acids, a heavy alcohol-containing catalyst phase, i.e. lower catalyst phase can be formed in the acid pre-esterification process.

In accordance with the invention, a strongly acidic, hygroscopic catalyst such as concentrated sulphuric acid, p-toluene sulphonic acid or the like is added at an amount which is customary when set in relation to the oil, which is, however, in relation to the added alcohol amount, added at an increased amount of 100% maximum relative to the added alcohol, and preferably 5 wt. % to 25 wt. % relative to the added alcohol. Relative to the free fatty acids contained in the employed oil or fat, the acid catalyst is preferably added at a weight ratio of catalyst to free fatty acids of 0.1 up to 1. The free fatty acids are subsequently reacted, acidicly catalyzed, to esters, at increased temperature, for example at the boiling temperature of alcohol. In principle, a moderate temperature range of between 30° C. and the boiling temperature of the respective alcohol (in the case of methanol approximately 70° C.) is recommended to obtain a separable glycerol phase. In this connection, it should be considered that the period of time required for pre-esterification at lower temperature is generally considerably high (compare for instance U.S. Pat. No. 2,383,601 A). In accordance with the invention, it is furthermore preferred to work at normal pressure, where when working at an increased temperature, between 1 and 4 hours were required for pre-esterification. Under the given conditions, esterification is continued as long until a sample several times washed with water to remove the added acidic catalyst shows an acid number of <1.5 (content of free fatty acids <1 wt. %). Depending on the content of free fatty acids and the reaction temperature, the reaction time amounts to between half an hour and three hours. After expiration of this time, no free fatty acids can be found in the fatty acid ester/oil mixture, not even by thin-film chromatography. Neither the content of mono- and diglycerides has been significantly increased. Free glycerol was not generated.

With the reaction sequence shown it is ensured that the glyceridically bound fatty acids present in the starting substance remain practically unchanged. By simultaneous addition of alcohol and acidic catalyst, integrity of the glyceridically bound fatty acids is obviously guaranteed up to the boiling point of alcohol at normal pressure. Neither occurs an addition reaction of the acid to the double bonds of unsaturated fatty acids which are always present in oils, in the presence of alcohol, at least not in an extent that would disturb the reaction and lower the yield.

It is surprising that by acidic pretreatment of the raw oil or fat in acidic-catalyzed esterification of the free fatty acids, the emulsion-forming property of the slimy substances present in the oil is destroyed, at least, however, reduced to a degree such that it is insignificant. During or after acidic esterification of the free fatty acids, the slimy substances may, at least partly, for example when cooling down the reaction mixture to room temperature, precipitate in form of flocs being separable for example by filtration.

The method of the invention implies a processing or working window wherein the water formed in the esterification of the free fatty acids is withdrawn by the added hygroscopic acidic catalyst, for example by hydration, from the esterification reaction, and is neither stripped nor carried or entrained by methanol. At the same time, the ability of the catalyst to chemically bind to the double bonds of unsaturated fatty acids is destroyed. However, the characteristic of the acidic catalyst being probably associated with reaction water and/or alcohol, of being able to destroy the emulsion-forming property of slimy substances is sufficiently preserved. It seems that by the method of the invention, even the fatty acids bound in the slimy substances are reacted to fatty acid esters. The phosphorus bound therein is removed with the glycerol wash phase and, at the latest, with the glycerol formed in the transesterification stage.

Carried out investigations of the ester phase have shown that it is free from phosphorus-containing compounds while the glycerol phase, on the other hand, contains phosphorus in dissolved form (which was detectable after corresponding pretreatment, for example after ashing in the presence of magnesium oxide).

In FIG. 2, there are provided for pre-esterification a mixing stage and three reaction vessels which can be raised to the required increased temperature and which include a heat exchanger. This is advantageous in that, while pre-esterification is performed batch-wise in the three reaction vessels, washing by the decanter can be performed continuously and at a high throughput.

The glycerol phase formed in an alkaline transesterfication having already been carried out is used, according to the invention, for neutralization of the reaction product of the acidic esterification stage. In the prior art, to the contrary, this glycerol phase is employed for washing the starting oil or for washing the reaction product of transesterification.

In accordance with the present invention, therefore, it is only after termination of the acidic esterification reaction that the obtained reaction mixture is washed prior to alkaline transesterification with the alkaline glycerol phase originating from a previous alkaline transesterification (FIG. 1). It is not necessary to carefully separate the ester originating from the alkaline transesterification from the glycerol phase since the ester remains in the reaction mixture. The separation of the glycerol wash phase may then be carried out by decantation or, more advantageously, by centrifugation since the glycerol phase is not soluble in the ester phase. In this case, too, residual amounts of wash glycerol contained in the neutral oil/ester phase do not disturb. The lower heavy glycerol phase to be discharged, however, should as much as possible be free from ester and oil. To this purpose, an extraction decanter is preferably used, i.e. a solid wall bowl centrifuge, in which the glycerol phase may particularly well be separated from the remaining liquid phase (FIG. 2). The decanter which is charged with the alkaline glycerol phase and the reaction product of the acidic pre-esterification, serves simultaneously as washing and separation means so that the process, despite the intermediate provision of the washing step, can very effectively be performed.

Since the alkaline glycerol phase contains practically the complete amount of alkaline catalyst, the complete amount of basic or alkaline catalyst can be used, after alkaline transesterification, for neutralization. The totally required alkaline catalyst amount may in this manner be considerably reduced. Moreover, the glycerol amount originating from transesterification may, at least partly, bind and remove reaction water of the acidic esterification. By suitably selecting the ratio of acidic to alkaline catalyst, the pH value of discharged glycerol phase can be controlled and thus glycerol can more easily be obtained. To this end, formation of a basic pH value will as a rule be preferred and the discharged glycerol phase will correspondingly be adjusted.

In accordance with the invention, the glycerol phase from the subsequent transesterification may be used without conditioning in a washing step and can again be discharged without clean separation. Residues of the glycerol wash phase will not disturb the subsequent alkaline transesterification. This is in complete contrast to the glycerol entrainer in the prior art mentioned above since in that case, the catalyst-containing entrainer phase had to be reliably separated. In order to make clean separation possible, relatively large methanol amounts have been necessary.

During said, otherwise uncritical, separation of the glycerol wash phase prior to transesterification, care should be taken that no esters are removed as well.

The intermediate product in form of the washed mixture of fatty acid glycerides which have remained unmodified and of the formed fatty acid esters is subsequently alkaline-catalyzedly transesterified. To this end, an alkaline catalyst, for example alkali hydroxide or an alcoholate, preferably of the alcohol used, is directly added. The alkaline catalyst causes alkaline transesterification, i.e. transesterification of the glyceridically bound fatty acids into fatty acid esters. The esters having been formed in the acidic process stage from the free fatty acids do not participate in the reaction.

The water formed in the acidically catalyzed esterification of the free fatty acids and having not completely been separated by washing does not interfere with the alkaline-catalyzed transesterification of the fatty acid tri-, di- and mono-glycerides into fatty acid esters of the primary (and secondary) alcohols.

Alkaline transesterification is performed according to FIG. 1 in two stages, wherein, after the first transesterification stage, the methyl ester and mono and di-glycerides still present are separated from alkaline glycerol by a separating decanter (solid wall bowl centrifuge). Separation into methyl ester and alkaline glycerol is performed after the second transesterification stage, for example in a centrifugal separator. In the drawing, furthermore, the required mixing stages are shown.

The fatty acid ester mixture formed according to the method of the invention may, advantageously after having destroyed the alkaline catalyst by neutralization, for example, by adding stoichiometric acid amounts, or by adding corresponding amounts of an acidic not ester-soluble adsorbent, for example in form of acidic bleaching clays, be purified from the excess amounts of alcohol, possibly present, by distillating-off the alcohol and by filtration in order to separate the added adsorbent. By this purifying operation, residual amounts of glycerol, if present, and solved in crude ester are removed as well.

A different, or additional, manner of purifying the raw ester mixture consists in washing the mixture with water. In this manner, too, the residual amounts of salts, catalyst, alcohol and glycerol can completely be removed. A disturbing formation of emulsions was not observed when carrying out esterification according to the invention.

For isolation of the fatty acid esters, the raw fatty acid esters as such can be subjected to distillation (preferably vacuum distillation). Thereby, they can be freed from waxes and other ester-soluble oil or fat- accompanying substances. However, for use as bio-diesel this is generally not necessary.

By means of the method of the invention it was possible to drastically lower the phosphorus content in the esters obtained. A phosphorus content of 175 mg/kg of the starting oil was, for example, lowered to less than 1 mg/kg in the bio-diesel produced.

In the method of the invention, the fatty acid ester amount obtainable relative to the fatty acids bound in the oil subjected to the method and relative to the content of free fatty acids contained in the oil, is nearly quantitative.

An advantageous further development of the method of the invention (FIG. 3) consists in acidifying the reaction glycerol used as washing glycerol after the washing step and, in this manner, to liberate the fatty acids from the soaps contained in the glycerol and to separate them together with entrained neutral oils. This is preferably effected by using a centrifuge in which a separable liquid light upper phase which contains fatty acids as well as entrained neutral oil, is obtained. In FIG. 3, sulphuric acid is used for acidifying the glycerol soap phase separated in the extraction decanter, which, to this end, is fed to a mixer. In a separator, the light "upper phase" is separated from the acidic raw glycerol and is directly returned into the acidic pre-esterification of the oil. In this manner, it becomes possible to convert the fatty acids which, due to partial saponification, are present in form of soaps and are discharged together with the glycerol phase from the alkaline transesterification process, as well as neutral oils into methyl ester and, in other words, thus raising the yield to a maximum possible value.

EXAMPLE

Preparation of the starting oil

A. Soapstock obtained from a refining process of native sun flower press oil and a same amount of slimy substances separated during refining were reacted with aqueous mineral acid in common manner to split fatty acid, were separated from the acidic aqueous phase containing excess amounts of mineral acid, were mixed with the same amount of slimy substance phase as separated in the refining, and the mixture of split fatty acids, slimy substances and entrained neutral oil so obtained was dried.

B. 95 g of native High-Oleic sun flower oil having an acid number of 3 were reacted with 10.5 g of the mixture produced sub A. The mixture so produced had an acid number of >10.

Applying the method a. 500 g of said mixture were heated to 58° C. and were mixed with a mixture of 2.1 g of concentrated sulphuric acid and 10 g of methanol (technical, water-free). After a few minutes, further 35.5 g of methanol were added. By using altogether 45.5 g of methanol for the acidic esterification, less methanol was added than is required for reacting all free and bound fatty acids into fatty acid ester. Samples drawn at various time intervals showed a rapidly decreasing acid number. After a reaction time of 2 hours, the acid number had decreased to 1.5 corresponding to an FFA (free fatty acid) content of <1 wt. %.

To estimate the performed process with regard to the behavior of the glycerides, further 25.7 g of methanol were added and it was stirred for a further hour at 58° C. With 71.2 g, the reaction mixture now contained more methanol than is required for reacting all free and bound fatty acids to fatty acid esters. Precipitation of glycerol could not be observed.

A glycerol phase separated in an already-performed alkaline transesterification process was added to the reaction solution generated sub step a. while intensively mixing and in such an amount that a sample in an aqueous extract indicated a pH value of approximately 7. Altogether 36.7 g of alkaline glycerol phase were required. The wash glycerol was separated in a separating funnel as heavy phase from the ester phase and drawn off. The wash glycerol, when diluted with water, showed neither emulsion tendency nor was there a precipitate in form of a lighter organic upper phase. It was subsequently free from fatty acid esters and from slimy substances being not soluble in basic aqueous phase.

b. The oil/ester phase separated from the wash glycerol phase was mixed with 17 g of 30 wt. % sodium methylate/methanol solution and maintained under stirring for 30 minutes at approximately 60° C. Subsequently, the reaction mixture was transferred into a separating funnel for separating the glycerol formed. 104 g of alkaline glycerol phase were separated. This glycerol phase could directly be used in further process executions for washing the acidic esterification phase of step a. The thin-layer chromatogram of the ester phase did not exhibit any mono-, di- and/or triglycerides and showed only fatty acid methyl ester.

In experiments in our Pilot Plant, the present and further examples were reproduced, using correspondingly larger amounts and the devices schematically shown in the figures. Crude High-Oleic sun flower oils, normal sun flower oil and rape oil having acid numbers of over 3 up to about 40 (corresponding to an FFA content of 20), have, for example, been successfully transesterified while simultaneously effecting desliming.

The invention claimed is:

1. Method of producing fatty acid esters of primary and/or secondary alcohols from raw unpurified oils and fats containing free fatty acids and slimy substances, or from waste oils loaded with free fatty acids from the food industry using alkaline catalyzed transesterification under formation of a separable glycerol phase and an acidic catalyzed esterification of free fatty acids preceding the transesterification, characterized in that
   a. first the acidic catalyzed esterification of the free fatty acids together with deactivation of slimy substances being present is performed with regard to the disadvantageous emulsion-forming properties thereof in that a water-free primary and/or secondary alcohol and a strongly acidic hygroscopic catalyst are added to the starting substance in form of the raw oil or fat or waste oil, respectively, wherein the added amount of water-free alcohol at least corresponds to the amount being stoichiometrically necessary for complete ester formation of the free fatty acids contained in the starting substance,
   b. that the reaction product of the acidic-catalyzed esterification is washed with the separated glycerol of an alkaline transesterification process having already been performed and the glycerol wash phase is subsequently separated,
   c. that the reaction product of the acidic-catalyzed esterification, having been washed in this manner, is subjected to said alkaline-catalyzed transesterification in that an alkaline catalyst and the amount of alcohol required for transesterification of the glyceridically bound fatty acids into fatty acid esters are added to said reaction product, and
   d. that the glycerol phase formed in step c. is separated from the esters of the free fatty acids and of the fatty acids present in glyceridically-bound form in the starting substance, having been formed in steps a. and c.

2. Method according to claim 1, characterized in that an alcohol excess relative to the stoichiometric amount in step a. amounts to 50% maximum, and that the acidic catalyst is added with 100 wt. % maximum, preferably 5 to 25 wt. %, relative to the added alcohol.

3. Method according to claim 1, characterized in that for, or during course of, the acidic-catalyzed esterification, no entrainer is added.

4. Method according to claim 1, characterized in that step a. of the esterification of the free fatty acids is performed at increased temperature so that the glyceridically-bound fatty acids according to step a. are still present in unmodified form.

5. Method according to claim 1, characterized in that when adding alcohol in step c., an alcohol excess is limited to 50% in relation to the stoichiometric amount for transesterification of the bound fatty esters.

6. Method according to claim 1, characterized in that the water-free alcohol is selected from short-chain alcohols, methanol, ethanol, propanol, isopropanol, butanol and/or isobutanol.

7. Method according to claim 1, characterized in that separation of the glycerol wash phase is performed under centrifugation.

8. Method according to claim 7, characterized in that separation of the glycerol wash phase is performed by means of a continuously operating centrifuge, particularly an extraction decanter.

9. Method according to claim 1 characterized in that water-free alcohol is added with an excess amount of 5% to 40% relative to the stoichiometrically required amount according to step a.

10. Method according to one of the foregoing claims, characterized in that concentrated sulphuric acid is used as the acidic catalyst.

11. Method according to claim 1, characterized in that the acidic catalyst is added in a weight ratio of catalyst in relation to free fatty acids contained in the oil or fat employed, ranging from 0.1 up to 1.

12. Method according to claim 1, characterized in that the glycerol phase separated in step d. is acidified and subsequently the acidic raw glycerol is centrifugally separated from a lighter phase still containing residual free fatty acids and neutral oil, which lighter phase is returned into the acidic pre-esterification stage of step a.

* * * * *